United States Patent
Vieira

(10) Patent No.: US 7,487,045 B1
(45) Date of Patent: Feb. 3, 2009

(54) PROJECTED SCORE AREA CALCULATOR AND METHOD OF USE

(76) Inventor: William Vieira, 1012 Bug Hill Rd., Ashfield, MA (US) 01330

( * ) Notice: Subject to any disclaimer, the term of this patent is extended or adjusted under 35 U.S.C. 154(b) by 251 days.

(21) Appl. No.: 11/308,199

(22) Filed: Mar. 10, 2006

Related U.S. Application Data

(60) Provisional application No. 60/594,095, filed on Mar. 10, 2005.

(51) Int. Cl.
*G01V 3/00* (2006.01)
*G06F 19/00* (2006.01)
*G06F 17/18* (2006.01)

(52) U.S. Cl. .......................... 702/2; 702/181
(58) Field of Classification Search ................ 702/1–4, 702/144, 181; 73/510
See application file for complete search history.

(56) References Cited

U.S. PATENT DOCUMENTS

| | | | | |
|---|---|---|---|---|
| 3,856,302 A | * | 12/1974 | Karkoska | 473/477 |
| 4,775,948 A | * | 10/1988 | Dial et al. | 702/149 |
| 5,526,326 A | * | 6/1996 | Fekete et al. | 368/10 |
| 5,768,151 A | | 6/1998 | Lowy et al. | |
| 5,779,576 A | | 7/1998 | Smith et al. | |
| 5,899,963 A | | 5/1999 | Hutchings | |
| 5,960,380 A | | 9/1999 | Flentov et al. | |
| 6,073,086 A | * | 6/2000 | Marinelli | 702/141 |
| 6,148,271 A | | 11/2000 | Marinelli | |
| 6,151,563 A | | 11/2000 | Marinelli | |
| 6,157,898 A | | 12/2000 | Marinelli | |
| 6,496,787 B1 | | 12/2002 | Flentov et al. | |
| 6,499,000 B2 | | 12/2002 | Flentov et al. | |
| 6,565,449 B2 | | 5/2003 | Buhler | |
| 6,594,623 B1 | | 7/2003 | Wang et al. | |
| 6,697,761 B2 | | 2/2004 | Akatsuka et al. | |
| 7,091,863 B2 | * | 8/2006 | Ravet | 340/572.1 |

* cited by examiner

*Primary Examiner*—Michael P Nghiem
(74) *Attorney, Agent, or Firm*—Doherty, Wallace, Pillsbury & Murphy, P.C.

(57) ABSTRACT

A device and system for measuring variables relative to a moving object on or over a geographic area, collecting such motion data, collecting environmental data including environmental conditions in the geographic area, collecting field data including data relating to the geographic area, and using the motion data, the environmental data, and the field data to calculate a score factor which defines where on the geographic area the moving object could have been moved from to land in a desired location and transmitting that extracted data to and through a variety of media including a portable device with a display, a personal computer, a broadcasting network or other storage device or system and using that extracted data for entertainment and educational purposes.

20 Claims, 1 Drawing Sheet

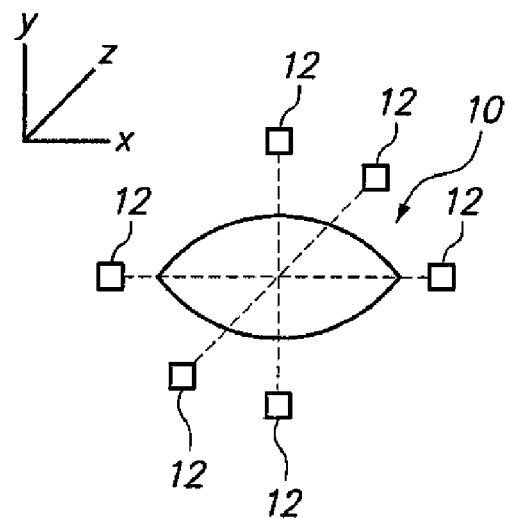
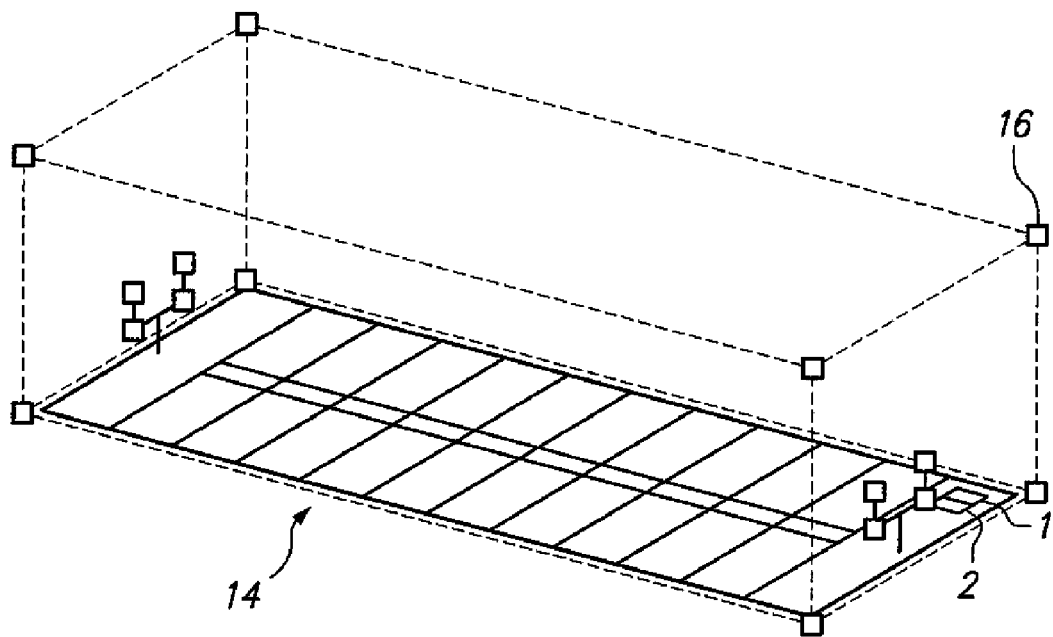

PROJECTED SCORE AREA CALCULATOR AND METHOD OF USE

CROSS REFERENCE TO RELATED APPLICATIONS

This application claims the benefit of U.S. Provisional Application No. 60/594,095 filed on Mar. 10, 2005.

BACKGROUND OF THE INVENTION

1. Field of the Invention

This invention relates to a projected score area calculator. More particularly, this invention relates to a device capable of collecting and storing data relating to the movement of a ball through space to generate a score factor. Through the use of the score factor, the device can calculate an originating point in space, from where, if the ball had started movement at the calculated originating point, the ball would have landed at a desired location.

2. Background of the Invention

In the sport of football, field goal kicks commonly win or lose the game. When the field goal kick is unsuccessful in passing though the field goal posts, it is of interest to the players, the coaches, the sportscasters, and the fans, to know, given all relevant factors, where on the field the same field goal kick under the same environmental conditions would have delivered the football between the field goal posts to constitute a score. Additionally, it may be useful to know where else on the field, a successful field goal kick would have also resulted in a score. Accordingly, it would be useful to have a device capable of calculating and storing data, such as, the wind velocity, the velocity of the football from its starting point to its landing point, the distance of the kick, the height of the kick, the trajectory of the ball from its starting point to its landing point, and the spin of the ball. The device would be able to take this initial data and transform it into a factor, which would be utilized by the device to calculate from where on the field the kick would result in a score.

SUMMARY OF THE INVENTION

Disclosed herein is a system for measuring variables relative to a moving object on or over a particular geographic location, collecting data relative to the measurements, collecting environmental data relating to the environmental conditions to which the moving object is exposed, collecting field data relating to the layout of the geographic location, using the various data to calculate a score factor which defines where on the field the object could have been moved from in order to have landed in a desired spot or area, and transmitting that extracted data to and through a variety of media including a portable device with a display, a personal computer, a broadcasting network or other storage device or system and using that extracted data for entertainment and educational purposes.

BRIEF DESCRIPTION OF THE DRAWINGS

FIG. 1 is a schematic depicting an exemplary arrangement of sensors on an exemplary ball; and FIG. 2 is a schematic depicting an exemplary arrangement of transmitters on an exemplary playing field.

DETAILED DESCRIPTION OF THE INVENTION

Disclosed herein is a device capable of detecting and storing motion data relevant in calculating the movement and projection of an object. The device can further detect and store environmental data including data indicating those environmental conditions that have an affect on the movement of the object, such as, for example, wind, humidity, precipitation, barometric pressure, and the like. The device further comprises a function for creating a score factor based on the motion data and the environmental data. The score factor identifies the score area, i.e., that area on the field where, had the ball, exposed to the same motion data and environmental data, been originally positioned, could have resulted in a score.

To compute the score factor, field data is preferably programmed into the device. For example, for a football field, the standard dimensions of a football field, including the position of the field goal posts is programmed into the device. Accordingly, the device integrates the motion data, the environmental data and the field data to create the score factor.

In an exemplary embodiment, the projected score area calculator comprises a sensing unit and a calculating unit. The sensing unit comprises a motion detection network that communicates through an electronic processor circuit to a radio transmitter. The calculating unit comprises a radio receiver, a processor, and an output display. The motion detection network is preferably embedded within or attached to a moving object, such as a football. The motion detection network may comprise an accelerometer network as described in full detail in U.S. Pat. No. 6,148,271 to Marinelli, and which is incorporated herein by reference in its entirety, wherein the accelerometer network detects centrifugal force, that is, acceleration generated by rotation about an axis. In an exemplary embodiment, the accelerometer network comprises acceleration sensors to detect spin of a moving object by measuring the centrifugal g-forces of a spinning moving object.

The g-forces experienced internal to a spinning ball are proportional to the square of the ball's spin rate. Since the acceleration sensors of the accelerometer network and the electronic processor circuit are able to measure the magnitude of the centrifugal forces, the spin rate can be deduced. Transmitting the g-force or spin rate information from the radio transmitter to the radio receiver of the calculating unit, along with the spin time datum (the amount of time that the ball was spinning) allows the monitor processor to calculate not only the speed and spin rate of a toss, but also the calculated potential for the ball to 'curve'.

If the axis of rotation of the ball is perfectly perpendicular to the ground plane, the total 'curve potential' can be realized. However, if the axis is parallel to the ground plane, the ball might not have any lateral deflection at all. In fact, with the proper orientation, the spinning may cause the ball to resist or accentuate the natural curve of a ball downward toward the ground due to gravity.

The calculating unit can use the distance, speed, and spin rate information to estimate the potential for lateral deflection. In certain embodiments, the calculating unit may also have barometric pressure and hygrometer (humidity meter) devices and a gyroscope, or some other gravity vector detection device. To more accurately calculate and describe the lateral deflection (which may be expressed in inches or centimeters of curve of the ball away from a straight line trajectory), the calculating unit incorporates gravity vector information along with barometric pressure and humidity information about the ambient air.

The accelerometer network may contain accelerometers of one or more of the following types: piezoelectric, mechanical, micro-machined silicon chip, or any other type small enough to be embedded, secured, or attached in a moving object. It may be advantageous to use two different types of sensors.

For example, in a football a mechanical sensor might be used to detect 'use' of the ball to activate the electronic processor circuit, whereas micro-machined silicon sensors might be used to detect spin events associated with the tosses or kicks to be measured. In this example, the mechanical switch provides the advantage of requiring zero power for its operation. The silicon sensors, unlike a mechanical on/off switch sensor, can provide an output proportional to the acceleration force.

Alternatively or in addition to the accelerometer network, the motion detection network may comprise magnetic field sensors as described in reference to U.S. Pat. No. 6,151,563 to Marinelli, which is incorporated herein in its entirety. The magnetic field sensors are sensitive to the earth's magnetic field and can sense changes in their orientation with respect to the earth's magnetic field. When securely embedded in a sporting device, the magnetic field sensors are used to give an indication of the sporting device's spin rate. Common types of magnetic field sensors currently used to measure the earth's magnetic field are flux-gate, magnetoinductive, anisotropic magnetoresistive, and Lorentz force sensors. Regardless of the type of sensor used, the basic concept remains the same: sense magnetic flux changes acting on the moving object's magnetic field sensor as a result of rotations of the moving object within the earth's fixed magnetic field.

Although the embodiments that follow depict a magnetoinductive sensor, other types of magnetic field sensors may be substituted. Magnetoinductive sensors are well known in the art of magnetic field sensing. A magnetoinductive sensor is simply a single wire winding coil that changes inductance based on its orientation within the surrounding magnetic field, such as the Earth's field. The coil is the inductance element in an inductor/resistor relaxation oscillator. The oscillator's frequency is proportional to the field being measured and to the degree of alignment of the longitudinal axis of the coil with the external magnetic field. As the sensor is rotated 180 degrees with respect to the earth's magnetic field, the observed frequency shift can be as much as 100%. The oscillator's frequency can be monitored by a microcontroller port to determine changes in the orientation of the coil.

Since the axis of rotation of a moving object relative to the magnetic field sensors can vary for many types of moving objects, it is often advantageous to use two or more magnetic field sensors. For example, if the longitudinal axis of a sensor coil is parallel to the axis of rotation, no change in field strength can be detected and spin rate determination is not possible. When using magnetoinductive field sensors, this problem can be overcome if a second magnetoinductive sensor is added that has the longitudinal axis of its sensor coil non-parallel to longitudinal axis of the first magnetoinductive sensor's coil. Ideally, the two coils' longitudinal axis would be orthogonal. Some types of magnetic field sensors do not have a sensor coil and, hence, do not have a longitudinal axis that defines the orientation of the sensor with respect to external fields.

Alternatively or in addition to the accelerometer network and/or the magnetic field sensors, the motion detection network of the sensing unit may comprise an acceleration sensor network as described in U.S. Pat. No. 6,157,898 to Marinelli, which is incorporated herein in its entirety. Such an acceleration sensor network uses g-force proportional output sensors. The acceleration sensor network is embedded, secured, or attached in the center of a moving object, such as a football, and utilizes g-force proportional output sensors that output a g-force proportional signal.

The acceleration sensor network is designed to detect or measure the spinning of the moving object about one or more internal axes that run through a center of the moving object.

Each g-force proportional output sensor is activated whenever power is supplied to the sensor. The g-force proportional output sensor, when experiencing no g-force, outputs a certain voltage, such as 2.5 volts. When the g-force proportional output sensor experiences g-force, the voltage output either rises above or falls below the no g-force level depending upon its direction of sensitivity.

The g-force proportional output sensors lie on a first axis and are typically equidistant from a center of the moving object for balance purposes, and their directions of sensitivity are opposite of each other. The same is true for the g-force proportional output sensors which lie on a second axis, and sense g-forces normal to the first axis. Though it is possible to sense rotation of the ball about any axis with only the g-force proportional output sensors on the first axis and the g-force proportional output sensors on the second axis, the g-force proportional output sensors located on the third axis may be added for additional sensitivity. Sensors sense g-forces normal to the plane formed by the first and second axes.

It is important that the positive direction of sensitivity (the voltage output is positive for centrifugal force in this direction) for each sensor along the same axis be arranged in the opposite direction. The electronic processor circuit determines that the moving object is spinning if both g-force proportional output sensors give an indication of force in their respective positive directions.

Again, acceleration events occurring due to translational movement of the moving object, such as that occurring in normal handling or bouncing, will be easily filtered out since for such events only one of the two opposing sensors will give a positive indication, and the other will give either no indication or a negative indication, depending on the type of sensor used.

Another embodiment of the acceleration sensor network uses only one g-force proportional output sensor. Here, the acceleration sensor network is embedded, secured, or attached in a moving object, such as a football, and utilizes only one g-force proportional output sensor that outputs a g-force proportional signal.

The acceleration sensor network is designed to detect or measure the spinning of the moving object about an axis of rotation that runs through the center of moving object and is perpendicular to and comes out of the plane of the page. Such a longitudinal axis is found along the long dimension of a football, running through a center line of the football from tip to tip. Typically, when a football is passed by a player in a spiral fashion, the football rotates about this longitudinal axis while in flight.

G-force proportional output sensor lies on a first axis which, in the preferred embodiment of the invention, is perpendicular to the axis of rotation that runs through a center of the moving object and is perpendicular to and comes out of the plane of the page. However, the g-force proportional output sensor could lie on any axis that is at an angle greater than zero to the axis of rotation.

Using this acceleration sensor network, it is possible to distinguish the g-force due to linear acceleration and the g-force due to centrifugal acceleration by virtue of the duration and strength of acceleration given a particular application (such as a football pass). The spin rate of a passed football does not decrease appreciably over the football's flight until it is caught, batted down, or falls to the ground. Knowing this, a flight event can be inferred given that:

1. The g-force measured is consistent with the centrifugal force due to the normal range of spin rates imparted on a football by a human user; and 2. The g-force measured remains fairly consistent or monotonically declines slightly over a period of time that is consistent with the flight time arising from a pass of a predetermined distance.

If conditions one and two above are met, the electronic processor circuit of the sensing unit embedded within the moving object would transmit the time-of-flight and g-force data to the calculating unit.

Another embodiment of the acceleration sensor network uses mixed pairs of mechanical g-force sensor switches and g-force proportional output sensors. Here, the acceleration sensor network is embedded, secured, or attached in the center of a moving object, such as a football, and utilizes g-force proportional output sensors that output a g-force proportional signal in combination with less costly mechanical switch type sensors. Since the centrifugal force measured by two g-force proportional sensors diametrically opposed along the same axis should be identical, only one g-force proportional sensor is really needed to determine the centrifugal force along an axis due to spinning of the object. This reduces the overall cost of the sensing unit, since the g-force proportional output sensors are generally more expensive than are the mechanical g-force sensors.

The acceleration sensor network is designed to detect or measure the spinning of the moving object about one or more internal axes that run through center of the moving object. Each mechanical sensor switch is activated whenever each switch experiences a g-force in excess of its threshold value in its direction of sensitivity.

Mixed pair mechanical g-force sensor switch and g-force proportional output sensor, referred to as a pair of mixed g-force sensors, lie on a first axis, are normally equidistant from center of moving object for balance purposes unless their respective weights are different, and their directions of sensitivity are opposite of each other. For some applications, only one pair of mixed g-force sensors, lying along one axis would be sufficient for measuring the motion data of interest.

For applications requiring two axes for measuring the motion data of interest, mixed pair mechanical g-force sensor switch and g-force proportional output sensor, referred to as a pair of mixed g-force sensors, lie on a second axis, which is optimally perpendicular to a first axis, so that the sensors are sensitive to g-forces normal to the first axis. Though it is possible to sense rotation of the ball about any axis with only mixed pair g-force proportional output sensor and mixed pair mechanical g-force sensor switches on the first axis and on the second axis, mixed pair mechanical g-force sensor switch and g-force proportional output sensor, located on a third axis, may be added for additional accuracy. The sensors are sensitive to g-forces normal to the plane formed by the first and second axes.

The mechanical g-force sensor switches are preferably tilt switches, having a conductive ball contained within a cylindrical or conical can shaped body. However, one skilled in the art will recognize that other types of mechanical switches could also be used. Mechanical g-force sensor switch is positively sensitive in a direction outward from center of moving object.

The electronic processor circuit determines that the moving object is spinning if the g-force proportional output sensor gives an indication of force in its positive direction (away from the center of the moving object), and the mechanical g-force sensor switch is on (in the closed position).

Again, acceleration events occurring due to translational movement of the moving object, such as that occurring in normal handling or bouncing, will be easily filtered out since for such events only one of the two opposing sensors will give a positive indication, and the other will give either no indication or a negative indication, depending on the type of sensor used.

Another embodiment of the acceleration sensor network uses mechanical g-force sensor switches and g-force proportional output sensors. Here acceleration sensor network is embedded, secured, or attached in the center of a moving object, such as a football, and utilizes a totally mechanical g-force sensor switch network to detect spin, and g-force proportional output sensors oriented with sensitivity to centrifugal force outward from the center of the rotating object, without using the g-force proportional output sensors in pairs. This technique reduces both cost and power consumption.

This acceleration sensor network is designed to detect and measure the spinning of the moving object about one or more internal axes that run through the center of the moving object. Mechanical g-force sensor switches lie on a first axis, are normally equidistant from center of moving object for balance purposes, and their directions of sensitivity are opposite of each other. For some applications, only one pair of sensors lying along one axis would be sufficient for measuring the motion data of interest.

For applications requiring two axes for measuring the motion data of interest, the mechanical g-force sensor switches lie on a second axis. The sensors sense g-forces normal to the first axis. Though it is possible to sense rotation of a moving object about any axis with only the mechanical g-force sensor switches on the first axis and the mechanical g-force sensor switches on the second axis, a third pair of mechanical g-force sensor switches, located on a third axis and normally equidistant from the center of the moving object, may be added for additional accuracy. The mechanical g-force sensor switch network, comprised of the mechanical g-force sensor switch pair on the first axis and the mechanical g-force sensor switch pair on the second axis, and possibly a third mechanical g-force sensor switch pair on a third axis, are used to detect spin.

One or more g-force proportional output sensors are oriented along one or more axes, or radii, emanating from the center of the moving object. The g-force proportional output sensors are oriented such that they can measure centrifugal force arising from the moving object's rotation. The axes or radii along which the g-force proportional output sensors lie may or may not coincide with any of the axes along which the mechanical sensors lie. Here, the g-force proportional output sensor lies on radii. The g-force proportional output sensor lies on radii, and senses g-forces normal to radii. The g-force proportional output sensor lies on radii, and senses g-forces normal to the plane formed by radii. The radii along which the g-force proportional output sensors lie are completely independent of the axes along which the mechanical g-force sensor switch pair switches lie, though each g-force proportional output sensor could lie upon the same axes as the mechanical g-force sensor switch pairs.

Once the electronic processor circuit determines that the moving object is spinning by virtue of the output from the mechanical g-force sensor switch network, a reading of the output of the g-force proportional output sensors would give an indication of the degree of centrifugal force present.

Since mechanical g-force sensor switches are generally less costly than g-force proportional output sensors, this arrangement can provide a cost reduction over a moving object that utilizes three pairs of g-force proportional switches that are diametrically opposed about the center of a moving object. This arrangement also enables the g-force proportional sensors to be kept in a low power mode, or totally unpowered, until spin is detected by the output from the mechanical g-force sensor switch network. Once spin is detected by the mechanical g-force sensor switch network, power would be supplied to the g-force proportional output sensors. The electronic processor circuit would receive readings of the centrifugal force present. Power would be turned off to g-force proportional output sensors. The g-force data would then be transmitted to the calculating unit. This approach confines power consumption by the g-force proportional output sensors to very brief periods that occur only during flight, and would greatly prolong the life of the battery which powers the sensing unit.

Additionally, the sensing unit may comprise a threshold circuit that must be above a predetermined minimum g-force level in order to activate the sensor(s) as taught in U.S. Pat. No. 6,073,086 to Marinelli, which is incorporated herewith in its entirety.

The sensing unit then communicates with the calculating unit such that the motion data detected by the sensing unit is transmitted to the calculating unit from the radio transmitter to the radio receiver. The motion data comprises, for example, distance, velocity, spin rate, and curve. Additionally, the motion data can include, for example, time of flight, or elapsed time, and trajectory height information as well. In fact, these two trajectory statistics are independent of the horizontal distance traversed by the moving object containing the sensing unit. Time of flight is simply obtained by measuring the amount of time between the start and end of spin of the moving object. This raw data is used in the velocity calculation. Provided that the launch altitude is equivalent to the landing altitude (or reasonably so with respect to the trajectory height) the moving object trajectory's maximum altitude can be calculated by the calculating unit and displayed to the user.

The equation that describes the vertical distance covered by a falling object is given as $d=(\frac{1}{2})at^2$ where: d=distance covered by the falling object (in inches); a=acceleration due to gravity (32.2 feet/sec$^2$); t=flight time—from the moment the object was released to the moment it hits the ground (in seconds).

It is also generally true that the fall time of an object that is catapulted is equal to its rise time. That is, the time it takes for a football to reach its maximum vertical height in a punt is equal to the time it takes for the ball to fall back to the ground, provided that the ball is received on the same stationary plane from which it was kicked, roughly about four feet off the ground. Hence, the vertical height h of a punted football with total air time ta is given by the following equation: $h=(\frac{1}{8})at_a^2$ The sensors making up the accelerometer network are arranged to detect spinning of the moving object about one or more internal axes. The sensing unit signals the commencement of spinning and the cessation of spinning, or it signals the measured elapsed time between these two events to the radio receiver of the calculating unit via the radio transmitter. The calculating unit assumes that the spinning of the moving object containing the sensing unit occurs only as the result of being in flight and calculates the speed of the moving object by dividing the distance covered by the moving object by the time of flight. The distance covered by the moving object may be entered into calculating unit via the keypad by the user. Alternatively, the distance may be provided by a remote distance measuring device such as an ultrasonic based measure.

Some types of sensors of the motion detection network would be capable of measuring the centrifugal force generated by the moving object's spin. The peak or average centrifugal g-force experienced by these sensors while the ball is spinning may also be transmitted to the calculating unit. The calculating unit, knowing the distance of the sensors from the axes of rotation, can calculate the spin rate R of the moving object using the following equation: $R=\sqrt{g/1.226\ r}$ where: R=revolutions/second; g=centrifugal g-force; 1=32.2 ft/sec$^2$; r=radial distance from axis of rotation to sensor in feet.

Multiple sensors should be employed in order to most accurately measure centrifugal force due to rotation, if that rotation can occur along an infinite number of axes through the center of a moving object, such as a baseball. For a system having three centrifugal force sensors, sensing along three orthogonal axes, most likely none of the three will perfectly align with the true centrifugal force vector which lies in a plane orthogonal to the axis of rotation. Hence, measurements from all three sensors should be used along with trigonometric relationships to derive the true centrifugal force. These calculations can be performed in either the sensing unit or the calculating unit.

The electronic processor circuit or the monitor processor may apply an adjustment factor to the measured elapsed time based upon the application. For example, simultaneous testing of the device with a Doppler radar system can be used to determine whether an adjustment for time, either adding or subtracting a few milliseconds, is necessary for the device to accurately calculate the speed of the ball.

Also, adjustment factors may be applied to the average speed to display an estimate of the peak velocity of a ball (the initial velocity when the ball left the kicker's foot), or the minimum velocity (the final velocity when the ball first lands). A kicked ball loses speed as it travels due to air resistance. The amount of speed loss varies for different average speeds.

Preferably, the accelerometer network is positioned and oriented in the center of the ball. For a football, the accelerometer network may be suspended in the interior center of the football.

The antenna for the radio transmitter is preferably fully contained within the core also. The final product is preferably impervious to summer heat, winter cold, and the g-forces resulting from fast pitches, kicks, hockey slap shots, bats, or hits. Another challenge is to maintain the symmetrical balance of the ball. In an air-filled ball the sensing unit could be suspended in the center using strings or fabric webbing or other suitable means.

When the motion detection network detects a spin event, it stimulates the radio transmitter to transmit signals conveying the duration of the spin event to the calculating unit, which is external to the sensing unit. The monitor processor of the calculating unit could calculate the speed of a kicked football using two pieces of information: 1) the duration of the spin event, and 2) the distance between the kicker and the field goal posts. The distance between the kicker and the field goal posts may be provided by the user to the monitor processor via manual entry through an input keypad or, alternatively, using a remote distance measuring device such as an ultrasonic based measure.

In addition to motion data, the sensing unit detects and collects environmental data including, for example, wind velocity, humidity levels, precipitation, barometric pressure, and the like. Such collection may be accomplished by means typically used to collect such environmental data. The sensing unit conveys the environmental data to the calculating unit. Alternatively, the environmental data may be collected by the calculating unit or by another unit separate from either of the sensing unit or the calculating unit.

Once the motion data and the environmental data have been collected, such data are transferred to the calculating unit. The calculating unit, which contains pre-programmed field data, i.e., data relating to the geographic location in which the projectile is set in motion, then utilizes the motion data, the environmental data, and the field data to make certain relevant computations. These relevant computations are then used to extract a score factor which defines where in the geographic location the projectile could have been kicked, tossed, hit, etc. with the same impact as the original kick, toss, hit, etc., and under the same environmental conditions, such that the projectile would land in a desired area or spot. For example, in the sport of football, the score factor may define other points on the field where a football could have been kicked such that, given the motion data of the original kick and the environmental data existing at the time of the original kick, the football would land in between and beyond the field goal posts to score.

Once the score factor has been determined it may be displayed on a display element located on the calculating unit. Alternatively or additionally, the score factor may be transmitted to a variety of media including a portable device with a display, a personal computer, a broadcasting network, or other storage device or system. The score factor may be used for entertainment and for educational purposes.

Further disclosed herein is a method for calculating the score factor and for transmitting the score factor over a variety of media. Referring to the figures, according to the exemplary method, a sensing unit of a projected score area calculator detects the motion of a moving object, such as a football 10, through a plurality of sensors 12 in communication with a plurality of transmitters 16, which are dispersed at key locations of a football field 14. In an exemplary embodiment, football 10 comprises six sensors, wherein two sensors are placed on an X axis, to sensors are placed on a Y axis, and two sensors are placed on a Z axis. The arrangement of the sensors along the X, Y, and Z axes, determine the changing ball orientation throughout flight (e.g., velocity and spin). Additionally, in an exemplary embodiment, sixteen transmitters are positioned on football field 14. Each of the transmitters emits a signal which is reflected by the sensors located on football 10. The time it takes for the signal to bounce back determines the distance of football 10. Utilizing as few as about four transmitters, the exact location of football 10 can be determined.

The sensing unit gathers the motion data detected by the sensors and transmitters and transmits the data to a calculating unit 2. Additionally, the sensing unit gathers environmental data, wherein such data includes environmental conditions having an impact on the motion of football 10. Such environmental data is then transmitted to the calculating unit. Alternatively, the environmental data is gathered by the calculating unit or by another unit 1.

The calculating unit 2 integrates the motion data to arrive at certain motion characteristics including, for example, the velocity, acceleration, curve, deflection, and trajectory path of the moving object. The calculating unit 2 then integrates the motion characteristics, the environmental data, and the field data, i.e., the pre-programmed layout of a football field 14 in which football 10 is in motion to arrive at a score factor. The score factor indicates where on football field 14 football 10 would have "scored" under the same environmental conditions and when put in motion by the same motion data. The score factor may then be transmitted to, for example, a display located on the calculating unit 2, a personal data assistant, a personal computer, a computer network, a handheld apparatus, or a wireless connection device, for example.

Therefore, although the moving object may comprise any projectile, and the area may include any geographic location, in a particularly preferred embodiment, the moving object comprises a football, and a particularly preferred area comprises a football field. In this embodiment, the calculating unit has a preprogrammed layout of the football field including the position of the field goal posts on both sides of the field ("field data"). When the football is kicked, the sensors in the sensing unit gather the movement data through the communication between sensors located in the football and transmitters located at various points on the football field. Additionally, the sensing unit gathers the environmental data. Both the movement data and the environmental data are transmitted to the calculating unit. The movement data is converted into motion characteristics by the calculating unit. The calculating unit then integrates the motion characteristics with the environmental data and the field data to arrive at the score factor. The score factor will indicate from what area(s) on the field had the football been kicked with the same motion data and environmental conditions as the original kick, the football would have landed between the field goal posts to result in a score. The score factor may then be transmitted to a variety of mediums for the use of coaches, players, sportscasters, and fans.

As required, detailed embodiments of the present invention have been disclosed herein. However, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure.

What is claimed is:

1. A projected score area calculator comprising:
    a sensing unit comprising a plurality of sensors in communication with a plurality of transmitters, wherein the plurality of sensors is disposed in a first moving object and the plurality of transmitters is disposed in a geographic area in which the first moving object is in motion, and further wherein the sensors and transmitters generate motion data relating to a movement of the first moving object, wherein the first moving object starts the movement at a point A and stops the movement at a point B;
    an environmental detection unit comprising elements for collecting environmental data relating to the environmental conditions in the geographic area in which the first moving object is in motion; and
    a calculating unit having preprogrammed therein field data which defines the geographic area, wherein the calculating unit integrates the motion data, the environmental data, and the field data to extract a score factor which defines where in the geographic area a second moving object, when subjected to the same motion data and environmental data as the first moving object, should be positioned in the geographic area such that the second moving object would land at a desired location in the geographic area, wherein the desired location is different from the point B.

2. The projected score area calculator of claim 1, wherein the environmental detection unit is disposed within the sensing unit.

3. The projected score area calculator of claim 2, wherein the environmental detection unit comprises at least one of a barometer, a hygrometer, and a gyroscope.

4. The projected score area calculator of claim 1, wherein the environmental detection unit is disposed within the calculating unit.

5. The projected score area calculator of claim 4, wherein the environmental detection unit comprises at least one of a barometer, a hygrometer, and a gyroscope.

6. The projected score area calculator of claim 1, wherein the first moving object and the second moving object comprises a football, the geographic area comprises a football field, the field data relates to a layout of the football field, and the desired location comprises an area between two field goal posts.

7. The projected score area calculator of claim 6, wherein transmitters from the plurality of transmitters are disposed along a perimeter of the football field and on the field goal posts.

8. A system for projecting a score area comprising:
   a score area calculator comprising:
      a sensing unit comprising a plurality of sensors in communication with a plurality of transmitters, wherein the plurality of sensors is disposed in a first moving object and the plurality of transmitters is disposed in a geographic area in which the first moving object is in motion, and further wherein the sensors and transmitters generate motion data relating to a movement of the first moving object, wherein the first moving object starts the movement at a point A and stops the movement at a point B;
      an environmental detection unit comprising elements for collecting environmental data relating to the environmental conditions in the geographic area in which the first moving object is in motion; and
   a calculating unit having preprogrammed therein field data which defines the geographic area, wherein the calculating unit integrates the motion data, the environmental data, and the field data to extract a score factor which defines where in the geographic area a second moving object, when subjected to the same motion data and environmental data as the first moving object, would land at a desired location in the geographic area, wherein the desired location is different from the point B; and
   a transmitter for transmitting the score factor over media.

9. The system of claim 8, wherein the media comprises at least one of a personal data assistant, a personal computer, a computer network, a handheld apparatus and a wireless connection device.

10. The system of claim 8, wherein the first moving object and the second moving object comprises a football, the geographic area comprises a football field, the field data relates to a layout of the football field, and the desired location comprises an area between two field goal posts.

11. The system of claim 10, wherein transmitters from the plurality of transmitters are disposed along a perimeter of the football field and on the field goal posts.

12. The projected score area calculator of claim 8, wherein the environmental detection unit is disposed within the sensing unit.

13. The projected score area calculator of claim 8, wherein the environmental detection unit is disposed within the calculating unit.

14. A method for determining where in a geographic area a first moving object ought to be positioned so that the first moving object will land at a desired location within the geographic location, wherein the method comprises:
   setting the first moving object in motion and then stopping the motion so that the first moving object stops at a point A within the geographic area;
   collecting motion data relating to the movement of the first moving object when the first moving object is in motion;
   collecting environmental data relating to the environmental conditions present in the geographic area in which the first moving object is in motion;
   collecting field data relating to the geographic area; and
   deriving a score factor based on the motion data, the environmental data, and the field data, wherein the score factor indicates where in the geographic area the first moving object, when subjected to the motion data, the environmental data, and the field data, ought to have been positioned when setting the first moving object in motion in the geographic location such that the first moving object would have landed in a desired location, wherein the desired location is different from the point A.

15. The method of claim 14, wherein collecting motion data is accomplished via communication between a plurality of sensors disposed within the moving object and a plurality of transmitters disposed on and/or within the geographic area.

16. The method of claim 14, wherein collecting environmental data comprises use of at least one of a barometer, a hygrometer, and a gyroscope.

17. The method of claim 14, wherein:
   collecting the motion data is accomplished via communication between a plurality of sensors disposed within the moving object and a plurality of transmitters disposed on and/or within the geographic area; and
   collecting the field data is accomplished by preprogramming data relating to the dimensions and layout of the geographical area into a calculating unit; and
   deriving the score factor is accomplished by transmitting the motion data to the calculating unit such that the calculating unit calculates the score factor taking into consideration the motion data, the environmental data, and the field data.

18. The method of claim 17, further comprising:
   transmitting the score factor to a display located on the calculating unit, a personal data assistant, a personal computer, a computer network, a handheld apparatus, or a wireless connection device.

19. The method of claim 18, wherein the geographic area comprises a football field, the field data comprises data relating to a layout of the football field, the first moving object comprises a football, and the desired location comprises an area between two field goal posts.

20. The method of claim 19, wherein transmitters from the plurality of transmitters are disposed along a perimeter of the football field and on the field goal posts.

* * * * *